April 16, 1968 B. CARTER, JR 3,377,880
RETRACTABLE MIRROR FOR MOTOR VEHICLES
Filed Aug. 8, 1966
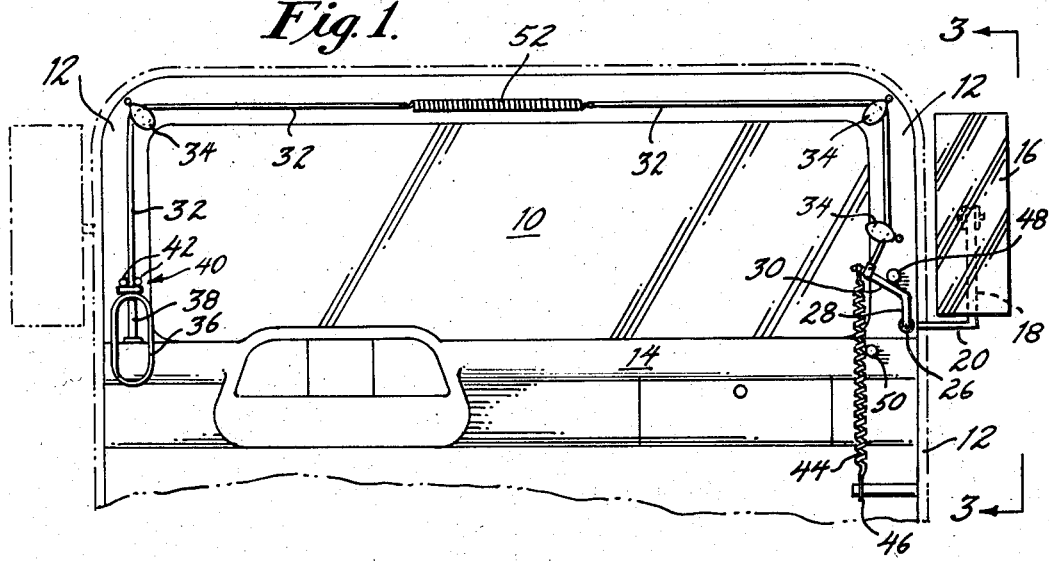
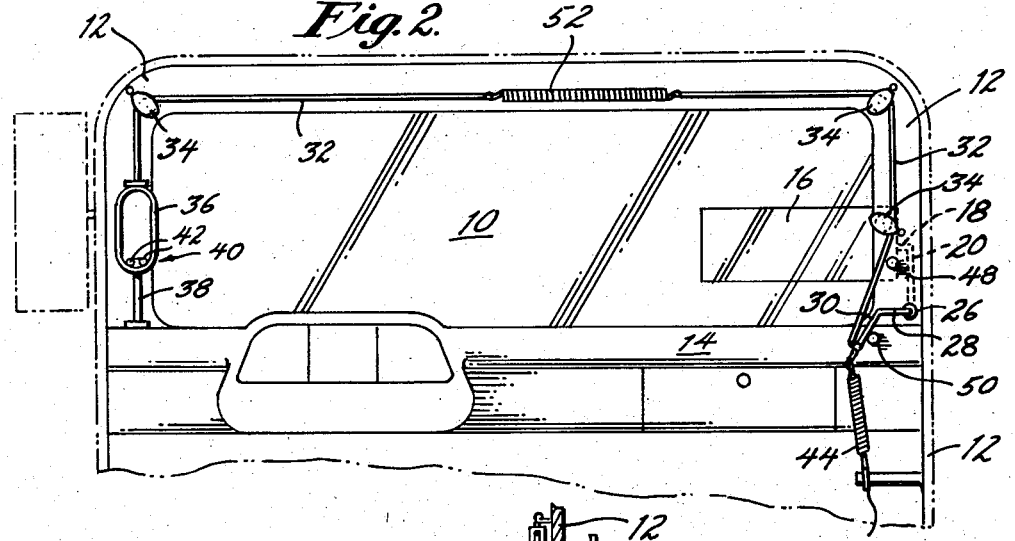
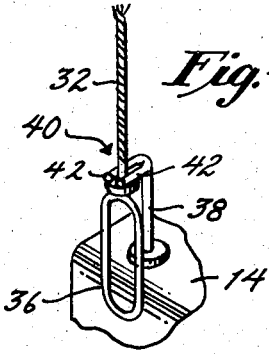
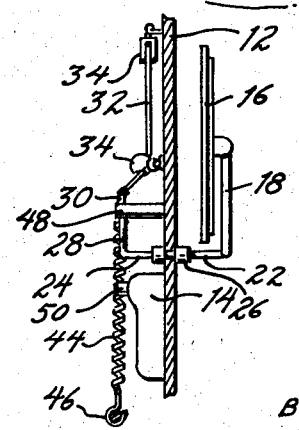
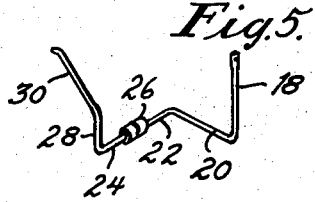
INVENTOR.
BELTON CARTER JR.
BY
ATTORNEY.

3,377,880
RETRACTABLE MIRROR FOR MOTOR VEHICLES
Belton Carter, Jr., 1410 N. Newkirk St.,
Philadelphia, Pa. 19121
Filed Aug. 8, 1966, Ser. No. 571,070
1 Claim. (Cl. 74—491)

ABSTRACT OF THE DISCLOSURE

A retractable mirror mounted on the outside of the curb side of a bus, means normally holding the mirror in a position to provide a rear view and means for retracting the mirror when the bus approaches a curb to prevent the mirror from hitting a pole or other obstruction.

---

This invention relates to a public transportation automotive vehicle.

Public transportation vehicles, and particularly the buses used in cities, must continuously pick up and let off passengers at a curb and, for safety and convenience, the bus must pull up right to the curb. In so doing, the curb side of the bus, which is the right side, will come very close to touching a telephone pole, signpost, or other obstruction. To serve its purpose, a rearview mirror must extend well beyond the side wall of the bus. This means that a mirror on the right side will either be damaged or it will prevent the driver from getting close to the curb. For this reason, city buses are provided with mirrors on the left side only, thus handicapping the driver who will be unable to see a pedestrian, cyclist, or even a small car on his right-hand side as he begins moving towards the curb. Also, the lack of a right-hand mirror prevents the drive from seeing if all the passengers leaving through a center, or rear door, of the bus have safety cleared away, before closing the doors and moving on.

The object of this invention is to provide a city bus with a rear view mirror on the right side thereof.

According to my invention, I provide the bus with a retractable mirror which is mounted on the right side of the bus and which is manually movable to an extended or "use" position while the bus is moving between stops and, if desired, while the bus is loading and discharging passengers, and which is movable to a retracted or "non-use" position while the bus is pulling up to, or driving away from, a curb.

The full nature of this invention will be understood from the following specification and the accompanying drawings in which:

FIG. 1 is a fragmentary elevational view of the dashboard and the windshield of a bus, and showing the mirror embodying the invention in its "use" or extended position.

FIG. 2 is a similar view but showing the mirror in its "non-use" or retracted position.

FIG. 3 is partly in section and partly in elevation, looking in the direction of line 3—3 on FIG. 1.

FIG. 4 is an enlarged, fragmentary perspective view of the mirror operating mechanism.

FIG. 5 is a perspective view showing details of the mirror mounting means and actuating mechanism.

In the accompanying drawings, only those details of the interior of a bus are shown as are necessary for the complete understanding of the invention, such as a windshield 10 and a frame 12 which surrounds the windshield and a portion 14 of a conventional dashboard.

According to my invention, a mirror 16 is mounted on the right-hand side of the bus by the mounting means which is best shown in FIG. 5 and which includes an arm 18 which is bent at a right angle to form arm 20, which is bent at a right angle to form arm 22. Arm 22 is adapted to be connected to arm 24 which is inside the bus and which is part of the mirror actuating mechanism. Conveniently, one of arms 22 or 24 is externally threaded and the other is internally threaded, with the internally threaded arm rotatably passing through a bore in the frame 12 for engaging with the externally threaded member. For tidiness and trim, the bore in the frame of the bus is lined with a sleeve or brushing 26. After passing inwardly through sleeve 26, arm 24 is bent at a right angle to form arm 28 which is bent to form arm 30. Arm 30 is connected to one end of a cord or other flexible member 32 which is guided, by swivelled pulleys 34, around the windshield and to the left, or driver's side where it is connected to a handle 36. An arm 38 is mounted on the dashboard in proximity to the driver and carries a keeper 40 which, as shown in FIG. 4, has spaced horizontal prongs 42 between which the cord 32 freely passes. It will be noted that handle 36 is too large to pass between said prongs and that it is hollow, or is recessed to receive said prongs.

The actuating mechanism also includes a tension spring 44 which is connected to arm 30 and to the bus frame as at 46 and which biases mirror 16 from its extended position to its retracted position.

The operation is as follows:

To rotate the mirror into its "use" or extended position, the driver pulls handle 36 downwardly to move arm 30 upwardly against the force of spring 44 until arm 30 abuts stops 48; places handle 36 beneath prongs 42 with cord 32 passing between said prongs and release said handle which assumes the position as seen in FIGS. 1 and 4.

To rotate the mirror to its "non-use" or retracted position, the driver moves the handle from the position of FIG. 1 to the position of FIG. 2 in which the lower end of handle 36 engages prongs 42. This permits spring 44 to pull arm 30 downwardly until it abuts stop 50.

In order to take up the slack in cord 32 which may be present in either position of the mirror, cord 32 is interrupted by a tension spring 52.

In the appended claim, the curb side of the vehicle refers to the side of the vehicle from which the passengers enter and leave the vehicle.

What I claim is:

1. In combination:
   means for mounting a retractable rear view mirror on the curb side of a vehicle and for moving said mirror relative to the windshield of said vehicle to a first position in which it is disposed outwardly of the plane of the curb side of the vehicle and to a second horizontal position in which it is disposed inwardly of said plane, said means including:
   a keeper mounted within said vehicle near the driver's side,
   a flexible element,
   guiding means directing said flexible element around the windshield to the curb side of the vehicle,
   a handle connected to one end of said flexible element and engageable with said keeper in an upper position to pay out, and in a lower position to pull in, said flexible element,
   a first arm within the vehicle and connected at one end thereof to the other end of said flexible element, a second arm without said vehicle and carrying said mirror at one end thereof, means connecting the other ends of said first and second arms, and a spring anchored at one end thereof to said vehicle and connected at its other end to said arms and operable to move said mirror to its second position when said handle is in its upper position, the movement of said handle to its lower position serving to move said mirror to its first position against the action of said spring.

References Cited

UNITED STATES PATENTS

| | | | |
|---|---|---|---|
| 730,361 | 6/1903 | Fyfe | 350—307 |
| 1,320,339 | 10/1919 | Norby | 74—487 |
| 1,340,802 | 5/1920 | Taber | 74—501 |
| 1,450,636 | 4/1923 | Latshaw | 74—487 |
| 3,059,790 | 10/1962 | Augustus | 350—307 X |

FRED C. MATTERN, Jr., *Primary Examiner.*

C. F. GREEN, *Assistant Examiner.*